(12) United States Patent
Stack et al.

(10) Patent No.: US 8,898,270 B1
(45) Date of Patent: Nov. 25, 2014

(54) IMPLICIT DETERMINATION OF REFERRAL SOURCES FOR SUBSCRIPTIONS TO CHANNELS

(75) Inventors: Andrew Stack, Palo Alto, CA (US); Anders Torp Brodersen, Wadenswil (CH); Anja Hauth, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 13/342,477

(22) Filed: Jan. 3, 2012

(51) Int. Cl.
*G06F 15/173* (2006.01)

(52) U.S. Cl.
USPC ............ 709/223; 709/203; 709/202; 709/224

(58) Field of Classification Search
USPC .................................. 709/223, 203, 202, 224
See application file for complete search history.

(56) References Cited

U.S. PATENT DOCUMENTS

| | | | |
|---|---|---|---|
| 2010/0250681 A1* | 9/2010 | Van Wely | 709/206 |
| 2011/0200052 A1* | 8/2011 | Mungo et al. | 370/401 |
| 2012/0254457 A1* | 10/2012 | Condon et al. | 709/231 |

* cited by examiner

*Primary Examiner* — Lan-Dai T Truong
(74) *Attorney, Agent, or Firm* — Amin, Turocy & Watson, LLP

(57) ABSTRACT

This disclosure relates to systems and methods for determining source information for subscribe and unsubscribe events to channels, indicating referring sources from which subscribers initiated the events, and presenting the source information to content providers of the channels.

25 Claims, 9 Drawing Sheets

310

WEB LOG:
310A — 01:25:11:09:45:56 request url: www.subscriptioncontentserver.com/subscribe
referrer url: www.subscriptioncontentserver.com/watch?video=vidid1
ip: ipaddress1
310B — 01:25:11:09:45:59 request url: www.subscriptioncontentserver.com/unsubscribe
referrer url: www.subscriptioncontentserver.com/watch?video=vidid2
ip: ipaddress2
310C — 01:25:11:09:46:03 request url: www.subscriptioncontentserver.com/subscribe
referrer url: www.subscriptioncontentserver.com/watch?video=vidid3
ip: ipaddress3
310D — 01:25:11:09:46:04 request url: www.subscriptioncontentserver.com/subscribe
referrer url: www.subscriptioncontentserver.com/watch?video=vidid4
ip: ipaddress4
310E — 01:25:11:09:46:04 request url: www.subscriptioncontentserver.com/subscribe
referrer url: www.subscriptioncontentserver.com/watch?video=vidid5
ip: ipaddress5

CHANNEL LOG:
320A — 01:25:2011:09:45:56  event: SUBSCRIBE
target: CHANNEL 1
country: US
320B — 01:25:2011:09:45:59  event: UNSUBSCRIBE
target: CHANNEL 2
country: CANADA
320C — 01:25:2011:09:46:04  event: SUBSCRIBE
target: CHANNEL 3
country: JAPAN
320D — 01:25:2011:09:46:04  event: SUBSCRIBE
target: CHANNEL 1
country: JAPAN

FIG. 3B

IMPLICIT DETERMINATION OF REFERRAL SOURCES FOR SUBSCRIPTIONS TO CHANNELS

TECHNICAL FIELD

This disclosure generally relates to systems and methods that facilitate identifying sources that drive subscribers to subscribe or unsubscribe to content.

BACKGROUND

The internet allows individuals and other entities to easily provide content to a vast population of content consumers. For example, an individual with a camcorder can create videos and post them on the internet for viewing at a global scale. Portals have developed that allow an entity to create a channel under which content they have provided can be organized. Content consumers that desire access to such content can subscribe to the channel, and be proactively informed when content associated with the channel is updated and available. Content consumers can also unsubscribe from the channel when they no longer have interest in the content. In many cases, there are benefits for content providers to have a large subscription base to their content such as for example financial and notoriety. Accordingly, content providers are incentivized to understand the reasoning behind why respective users subscribe to or unsubscribe from their content channel.

Conventionally, this is accomplished through explicit methods such as for example surveying users, or by explicitly linking or joining the subscribe or unsubscribe event for a particular channel to the source content or universal resource locator (URL) from which the event took place. However, there are systems where such explicit methods are not available or suitable (e.g., for technology or performance reasons, or not desired for privacy reasons).

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with an implementation, a logging component generates one or more logs containing log entries related to subscriptions to channels of content, and a source determination component analyzes the one or more logs to infer source information indicating a referring source associated with a completed subscribe or unsubscribe event.

In accordance with another non-limiting implementation, one or more logs are generated containing log entries related to subscriptions to channels of content. The one or more logs are analyzed and inferences are made regarding source information that indicate a referring source associated with a completed subscribe or unsubscribe event.

These and other implementations and embodiments are described in more detail below.

BRIEF DESCRIPTION OF THE DRAWINGS

FIG. 3A illustrates exemplary non-limiting examples of a web log in accordance with implementations of this disclosure.

FIG. 3B illustrates exemplary non-limiting examples of a channel log. in accordance with implementations of this disclosure

DETAILED DESCRIPTION

Overview

Figure 1:
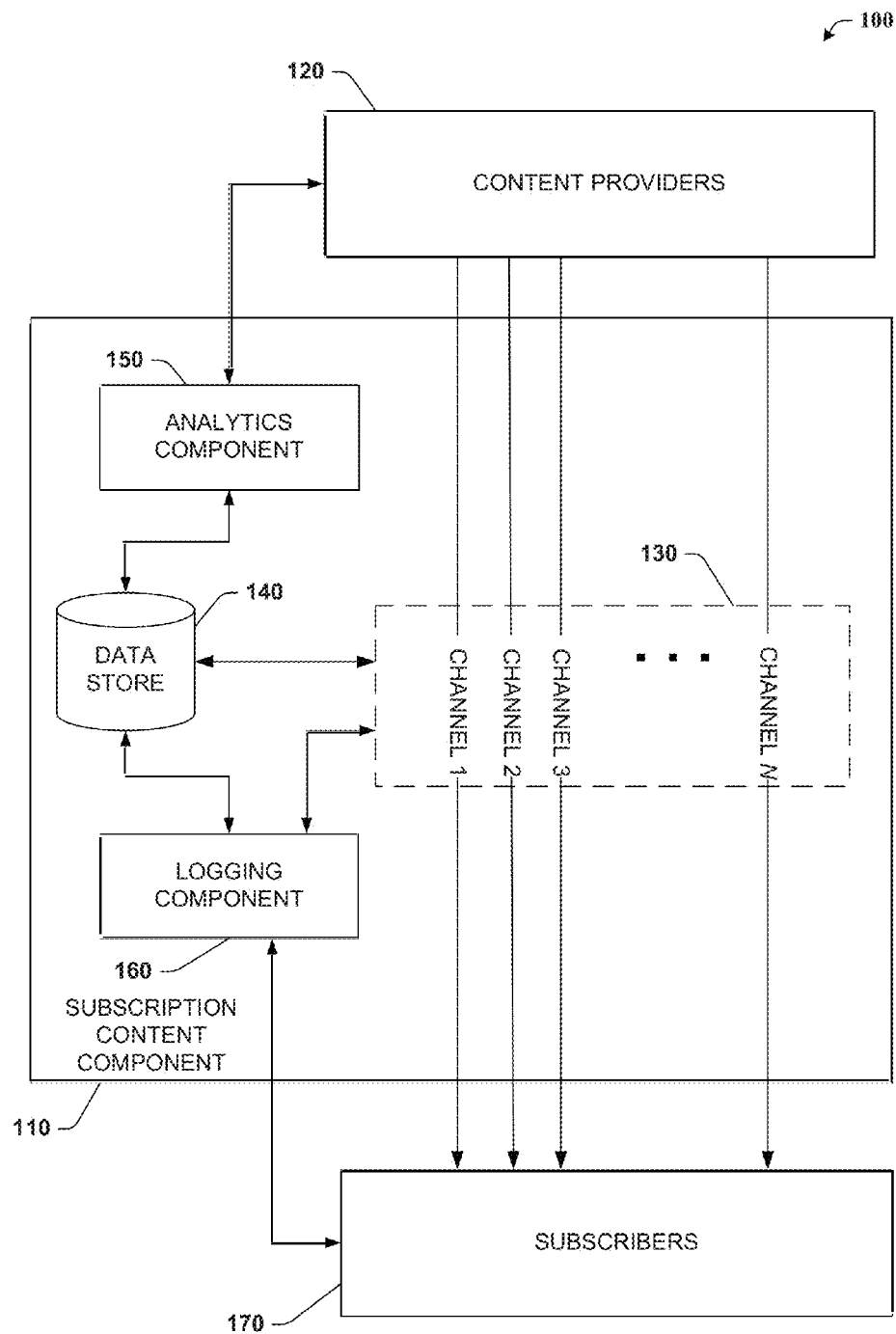
FIG. 1 illustrates a block diagram of an exemplary non-limiting server system that provides channels of content to subscribers, and determines and provides source information for channel subscribe and unsubscribe events to content providers in accordance with implementations of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In accordance with various disclosed aspects, source information is provided identifying sources that drive subscribers to subscribe or unsubscribe to a content provider's channel. A channel can include any type of content, for example, video, audio, image, text, or any combination thereof that a content provider makes available to a population of users. A content consumer can choose to subscribe to a channel that has content of interest. For example, the content consumer can watch a video on a channel and opt to subscribe to the channel using a subscription link associated with the video. In another example, a portion of audio content from a channel may be embedded in a music blog on another website. A content consumer reading the blog and listening to the audio content could subscribe to the channel using a subscription link associated with the audio content. In an additional example, a content consumer already be subscribed to a channel that contains video, may be reading an annotation added by the content provider associated with a video and decide to unsubscribe from the channel using an unsubscribe link associated with the annotation.

As noted above, content providers can benefit from having information that identifies the source(s) for the subscribe or unsubscribe events. Referring back to the examples provided above, in the first example, knowing that users subscribed while watching a particular video can be an indication that the video was particularly good and the content provider may desire to provide additional videos with similar content. In the audio content example above, a content provider may be interested to know that a particular music blog is driving subscriptions to their channel and may reach out to the music blog author. Similarly, the content provider may want to be aware of content, such as an annotation they added, that is driving users to unsubscribe, as this may be in indication that the annotation was offensive. Given source information for subscribe and unsubscribe events, a content provider can tailor content and relationships with other web sites to increase subscriptions.

In one or more embodiments, the disclosed aspects relate to employing implicit methods for determining or inferring referring source information in a system where explicit methods of tracking such source information are not employed, and presenting the inferred source information to a content provider. A source for a subscribe or unsubscribe event for a channel can be for example: a web page within the channel, content within the channel, another channel, a page within another website, a search engine, an advertisement, or any other type of internet location from which a content consumer can initiate a subscribe or unsubscribe action associated with the channel. Moreover, a content consumer can initiate a subscribe or unsubscribe from an internet location, such as a selectable link or button, that can be completed at another internet location, for example, on a page within the channel. Furthermore, a content consumer can choose not to complete the subscribe or unsubscribe once directed to another location for completion. This is particularly relevant as there may be a separate log which records the source from which the content consumer was referred that is different from a log which records completed subscribe and unsubscribe events. As such, it may be advantageous to make inferences to determine the relationship between completed subscribe or unsubscribe events and their referring source.

Accordingly, described below are several non-limiting embodiments that provide source information for subscribe and unsubscribe events in content subscription systems. Such embodiments may be particularly beneficial in content subscription systems that lack explicit tracking for this source information.

Example Subscription Content Component

Figure 2:
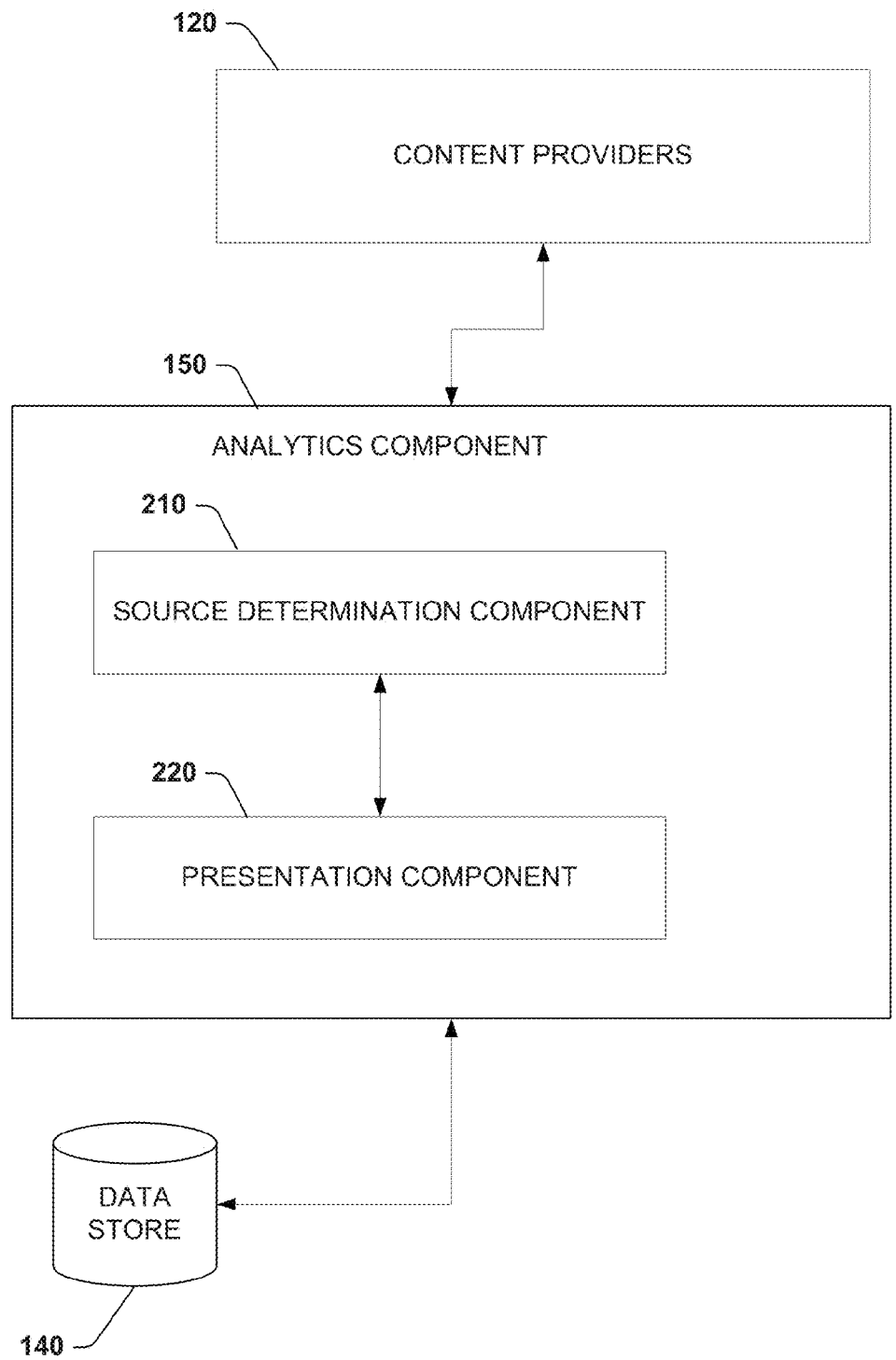
FIG. 2 illustrates a block diagram of an exemplary non-limiting analytics component that determines and provides source information for subscribe and unsubscribe events in accordance with implementations of this disclosure.

Referring now to the drawings, FIGS. 1-3 provide details regarding a subscription content component 110 and its interaction with content providers 120 and subscribers 170 (also herein referred to as content consumers or users). With reference initially to FIG. 1, a system 100 that provides source information for subscribe and unsubscribe events is depicted. System 100 includes a subscription content component 110 that determines source information for subscribe and unsubscribe events from subscribers 170 to channels 130 and presents the source information to content providers 120.

Figure 9:
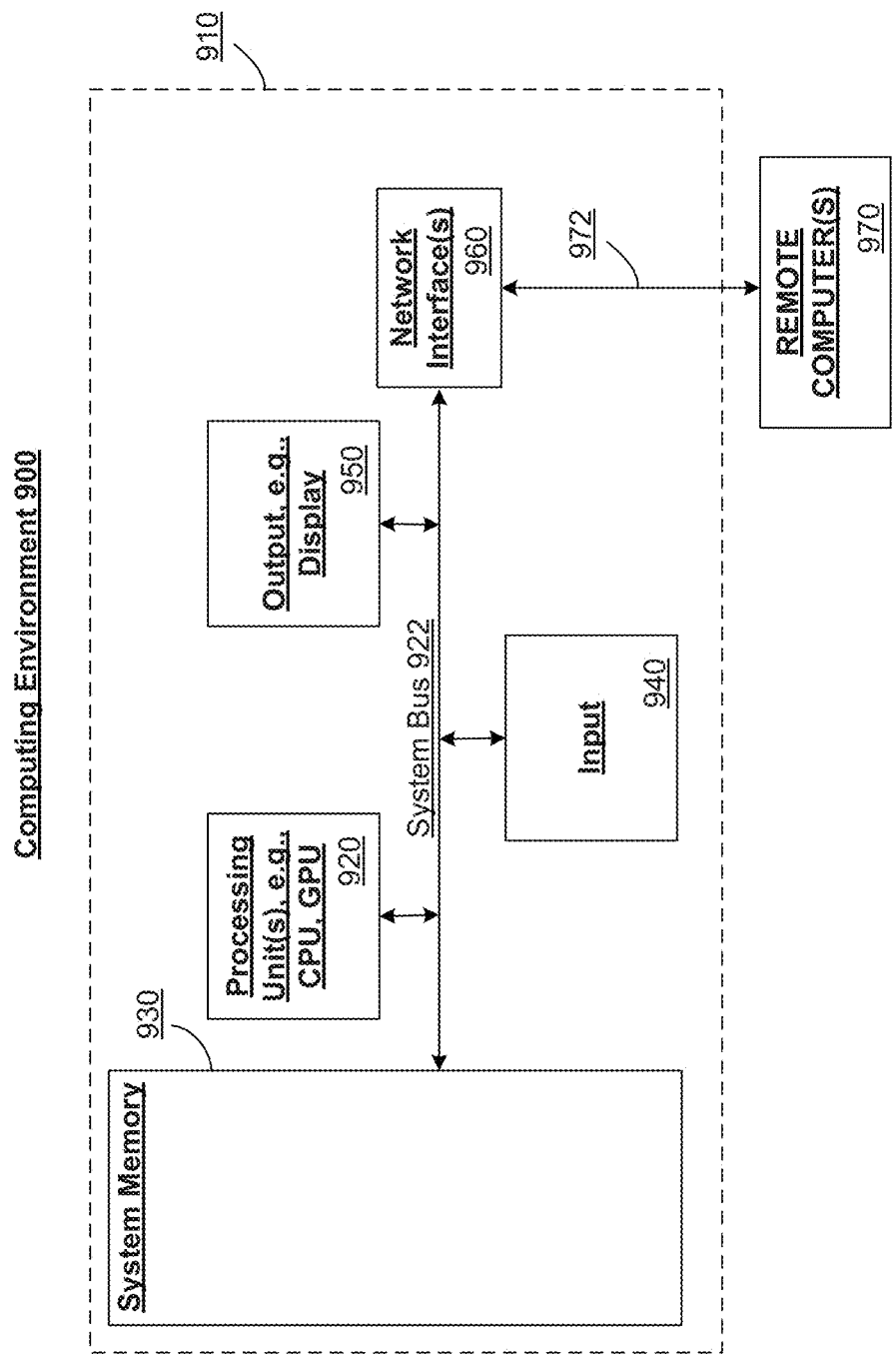
FIG. 9 is a block diagram representing an exemplary non-limiting computing system or operating environment in which the various embodiments of this disclosure may be implemented.

Subscription content component 110 includes a memory that stores computer executable components and a processor that executes computer executable components stored in the memory, a non-limiting example of which can be found with reference to FIG. 9. In one implementation, subscription content component 110 can be incorporated into a content system (e.g., that of a cable television provider, satellite television provider, internet service provider, digital subscriber line provider, mobile telecommunications provider, cellular provider, radio provider, internet portal, or any other type of system that allows entities to provide content via wired or wireless mediums) that provides content to subscribers 170.

Subscription content component 110 includes an analytics component 150 that determines source information for subscribe and unsubscribe events to channels 130 and presents the source information to content providers 120. Subscription content component 110 further includes a logging component 160 that logs interactions with subscription content component 110. Additionally, subscription content component 110 includes a data store 140 that stores data generated by the analytics component 150 and logging component 160. Furthermore, data store 140 can store content provided by content providers 120 that can be provided to subscribers in channels 130. Alternatively, it is to be understood that content can be stored at the content providers and accessed by subscribers through subscription content component 110 organized in channels 130. For example, channels can have links to content or redirect subscribers to content at channel providers 120 or a different content storage location. Channels 130 comprise any number of channels 1 to N, where N is in integer indicating number of channels. Likewise, there can be any suitable number of content providers 120 including a sole content provider 120 can provide content for the channels 130. A content provider 120 can be an entity, such as for example an individual, group of individuals, organization, business, electronic device, or computing process, that can provide content. Furthermore, there can be any number of subscribers 170 and a subscriber 170 can subscribe to any number of channels 130. It is to be understood that a subscriber 170 can be any entity, such as an individual, group of individuals, organization, business, electronic device, or computing process that can subscribe to content. Data store 140 can be stored on any suitable type of storage device, non-limiting examples of which are illustrated with reference to FIGS. 8 and 9.

With continued reference to FIG. 1, logging component 160 generates various logs that records interactions of content providers 120, subscribers 170, and other websites with subscription content component 110 and one or more channels of channels 130. For example, logs can record subscribers' 170 requests for content or requests to subscribe or unsubscribe to channels 130. In another example, logs can record adding, deleting, or modifying of channels 130 or content by content providers 120. In an additional example, logs can record links to or embedding of content from a channel in other channels or websites. For example, a literary blog may embed a poem from a channel in their blog or a content provider may provide a link in an annotation of their content to content in another channel. Continuing with this example, a search engine may provide links to or embed content in search results. It is to be understood that these are non-limiting examples of logging information and that any suitable type of data related to interactions of content providers 120, subscribers 170, and other websites with subscription content component 110 and channels 130 can be recording in logs.

FIG. 1 depicts data store 140 as included within subscription content component 110, thereby reducing delay associated with communication had data store 140 been located remotely. However, it is to be appreciated that data store 140 can optionally be located remote from subscription content component 110.

Referring to FIG. 2, analytics component 150 is illustrated in greater detail. Analytics component 150 determines source information for subscribe and unsubscribe events and presents the source information to content providers 120. Analytics component 150 includes source determination component 210 that infers or determines sources for subscribe and unsubscribe events to channels 130. Analytics component 150 further includes presentation component 220 that generates displays or reports of the source information to present to content providers 120.

Source determination component 210 analyzes logs in data store 140 to infer or determine a source from which a subscribe or unsubscribe event was initiated. For example, entries from a log that records subscribe and unsubscribe events can be analyzed to infer related entries from a disparate log that records referring sources to subscribe and unsubscribe link requests. It is to be appreciated that the logs generated by logging component 160, unlike conventional methods, may not record uniquely identifiable information common to both logs that can be directly linked or joined to make an explicit connection between the entries from one log to another log. Furthermore, while the example described herein discloses multiple logs, entries can be of differing types in a single log where differing entry types may not have uniquely identifiable information common to both entry types that can be directly linked or joined to make an explicit connection between two log entries. Additionally, source determination component 210 can derive information from log entries, for example, through extrapolation, interpolation, approximation, calculation, association, combination, searching, or by any other technique by which additional information can be derived from existing data. For example, an Internet Protocol (IP) address captured from a network or a GPS coordinates captured from a mobile device, if such data is available, can be used to approximate a geographic location. Source determination component 210 can employ the derived information to infer relationships between entries of a single log or plurality of logs. Source determination component 210 can also determine a confidence score for source information indicating a level of confidence in the accuracy of the source information.

Referring to FIGS. 3A and 3B, a non-limiting example WEB LOG 310 and CHANNEL LOG 320 are depicted respectively for channels of video content. WEB LOG 310 has five log entries 310A-E and CHANNEL LOG 320 has four log entries 320A-D. WEB LOG entry 310A, for example, shows a date and time of Jan. 25, 2011 at 9:45:56 AM, along with a URL request of "subscribe", a referring URL from "vidid1", and an ipaddress1 from which the request occurred. The other WEB LOG entries 310B-E have similar information specific to the transaction recorded. CHANNEL LOG entry 320A, for example, shows a date and time of Jan. 25, 2011 at 9:45:56 AM, along with an event of "SUBSCRIBE", target for the event indicating "CHANNEL 1", and the country from which the event took place indicating "US". Similarly CHANNEL LOG entries 320B-D have information specific to the transaction recorded. It should be noted that neither log has uniquely identifiable information that is common to both logs and can be explicitly linked or joined between the logs. Conventionally, for example, a unique transaction identifier or uniquely identifiable information for a subscriber may be recorded that is common to both logs such that an explicit connection can be made between an entry of one log to an entry of the other log. However, as noted above, technology, performance, privacy, or other reasons may limit or prevent recording information to make such an explicit link. As such, relationships between an entry of one log to an entry of another log may require implicitly inferring such relationships.

While examples herein depict logs with log entries, such as a log file, it is to be appreciated that the various aspects and features of this disclosure are also applicable to databases. For example, a database may not have uniquely identifiable information that is common to a set of tables that allow for explicit matching or linking of databases records, such as a key. As such, implicit determinations as discussed herein, can be employed to match or link database records.

Furthermore, the example in FIGS. 3A and 3B depicts date and time stamps that may seem as first glance to be uniquely identifiable information that is common to both logs that allows for explicitly linking or joining of log entries. However, in that example, the date and time stamp are not uniquely identifiable information that is common to both logs and can be explicitly linked or joined between the logs. This may be because of, for example, a lack of sufficient precision in the time, a lack of clock synchronization between clocks used for the two logs, and/or the date and time stamps being associated with different time zones.

Continuing with reference to FIGS. 3A and 3B, along with reference to FIG. 2, source determination component 210 can analyze WEB LOG 310 and CHANNEL LOG 320 and make inferences in order to determine which entry in WEB LOG 310 may be associated with an entry in CHANNEL LOG 320. In this example, source determination component 210 may examine the log entries temporally to identify log entries having the same or close timestamps. For example, source determination component 210 can determine that CHANNEL LOG entry 320A, has a date and time of Jan. 25, 2011 at 9:45:56 AM which is the same date and time of WEB LOG entry 310A, and does not appear to be near in time to the other WEB LOG entries 310B-E. For further confirmation that these two entries are related, source determination component 210 can determine that the requested URL including "subscribe" for WEB LOG entry 310A corresponds to the event of "SUBSCRIBE" of CHANNEL LOG entry 320A. Additionally, source determination component 210 may derive information from log entries. For example, continuing with the analysis, source determination component 210 can examine the referrer URL of WEB LOG entry 310A and by examining information in data store 140 determine that "vidid1" corresponds to a video that is included in CHANNEL 1, which corresponds to the target "CHANNEL 1" of CHANNEL LOG entry 320A. As an additional confirmation, source determination component 210 can, for example, examine another data repository or perform an internet search to determine that ipaddress1 of WEB LOG entry 310A corresponds to an Internet address in the United States and determine that this location corresponds to the country "US" of CHANNEL LOG entry 320A. Using the results of the analysis, source determination component 210 can infer that WEB LOG entry 310A corresponds and is likely a referring source to the subscribe event of CHANNEL LOG entry 320A. Source determination component 210 can perform a similar analysis to infer that WEB LOG entry 310B corresponds to the "UNSUBSCRIBE" event of CHANNEL LOG entry 320B.

Examining CHANNEL LOG entries 320C-D, source determination component 210 can determine that they have the same date and time of Jan. 25, 2011 at 9:46:04 AM, and that there are two WEB LOG entries 310D-E which have a date and time that are the same as CHANNEL LOG entries 320C-D. With further examination, source determination component 210 can also determine that WEB LOG entries 310D-E and 320C-D all correspond to a "subscribe" requested URL and "SUBSCRIBE" event respectively, and thus, the WEB LOG entries 310D-E may correspond to CHANNEL LOG entries 320C-D. Analyzing further, source determination component 210 determines that ipaddress4 WEB LOG entries 310D is an Internet address in Japan which corresponds to the country "JAPAN" of CHANNEL LOG entries 320C and 320D. However, in this example, source determination component 210 determines that ipaddress5 is an Internet address in Brazil, which does not correspond to the country "JAPAN" of CHANNEL LOG entries 320C and 320D. As such, source determination component can infer that WEB LOG entries 310E does not correspond to CHANNEL LOG entries 320C-D. Source determination component 210 can then examine WEB LOG Entry 310C and determine that its date and time of Jan. 25, 2011 at 9:46:03 AM is near the date and time of CHANNEL LOG entries 320C and 320D, and thus, may be a corresponding entry. Source determination component 210 further determines that ipaddress3 of WEB LOG entry 310D is an Internet address in Japan which correspond to the country "JAPAN" of CHANNEL LOG entries 320C and 320D. Therefore, WEB LOG entries 310C-D can correspond to CHANNEL LOG entries 320C and 320D. To further differentiate the entries, source determination component 210 examines the referrer URLs of WEB LOG entries 310C and 310D to determine that vidid3 is a video on CHANNEL 1 which corresponds to the target "CHANNEL 1" of CHANNEL LOG entry 320D, and determine that vidid4 is a video on CHANNEL 3 which corresponds to target "CHANNEL 3" of CHANNEL LOG entry 320C. Therefore, source determination component can infer that CHANNEL LOG entry 320C is associated with WEB LOG entry 310D, and that CHANNEL LOG entry 320D is associated with WEB LOG entry 310C. Furthermore, source determination component 210 can infer that WEB LOG entry 310E is not associated with CHANNEL LOG entries 320A-D. For example, a subscriber who initiated a subscribe request associated with WEB LOG Entry 310E may have chosen not to complete the subscription. As such, there would be no corresponding CHANNEL LOG entry. Source determination component 210 can record inferences and determinations in data store 140.

WEB LOG 310 and CHANNEL LOG 320 are non-limiting examples of possible data that can be recorded. One of ordinary skill in the art would recognize that any type of data can be recorded in logs where there is no explicit link between a log entry in one log to an entry in another log, or between differing entry types within a single log.

Referring back to FIG. 2, presentation component 220 can generate various displays and reports using the inferences and determinations made by source determination component 210 and/or stored in data store 140. For example, presentation component 220 can generate a report or display, automatically or based upon a request, that aggregates source information by event type (e.g., subscribe or unsubscribe), source, type (e.g., type of content, type of source, type of website), or by any other data type by which a source is stored. Presentation component can also, for example, present a confidence score associated with source information or employ a confidence threshold to restrict presentation of source information that does not have a confidence score exceeding the confidence threshold. Displays and reports can be predefined or customizable. For example, presentation component 220 can provide an interface by which an entity can customize a display or report, such as drill-down and drill-up navigation, graphing, charting, sorting, filtering, aggregating, grouping, subtotaling, creating tables, and other reporting features. Presentation component 220 can store customizations in data store 140, for example, in a profile associated with an entity. It is to be understood that presentation component 220 can deliver the display or report proactively to an entity, for example, as an e-mail attachment or fax, or can make the display or report available upon request through a web page, application, or application programming interface (API). For example, a content provider can set up preferences in presentation component 220 for displays or reports which he would like to receive automatically at predetermined intervals. Alternatively, for example, a content provider can access a web portal from which she can request specific displays or reports to be generated on demand according to customized preferences. Furthermore, presentation component 220 can employ security techniques to restrict access to displays and reports to only those authorized to have access, for example, by login/password, digital certificates, public/private key encryption, biometrics, or other security technologies.

Figure 4:
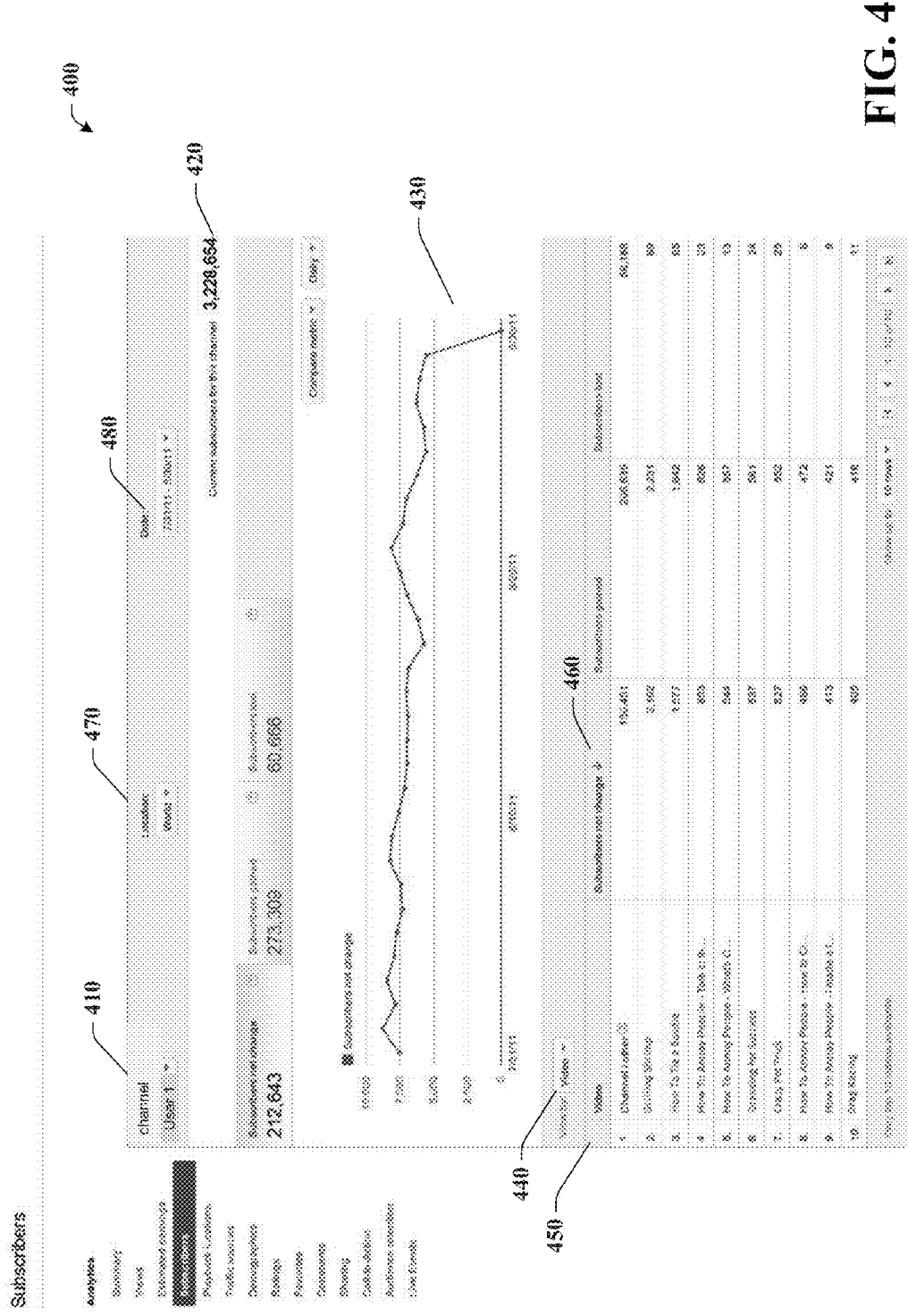
FIG. 4 illustrates an exemplary non-limiting example of a source information display in accordance with implementations of this disclosure.

Referring to FIG. 4, a non-limiting example of a customizable display 400 of source information is depicted. Element 410 is a selection element that allows for choosing a channel for which information is to be displayed. Element 420 shows the current number of subscribers for the selected channel. Element 430 is a graph showing the net change in subscribers over a selected period of time. Element 440 is a selection element that allows for selecting a type of source to display, which in this example is "Video". Element 450 is a table of source information with columns showing an aggregation of subscriber net change, gains, and losses by each particular video sorted on subscriber net change. This example, shows at row 2 of element 450 that a video titled "Grilling Shrimp" resulted in the largest net increase in subscribers. Within element 450, row 1 shows the total change in subscribers attributed to sources other than video source types, for example, for comparison purposes. Element 460 shows a selection element for choosing the sorting criteria. In this example, the source information is sorted by "subscriber net change" in descending order. Element 470 is a selection element for choosing the geographic location for which data is displayed and Element 480 is a selection element for selecting the date range for which data is displayed.

Figure 5:
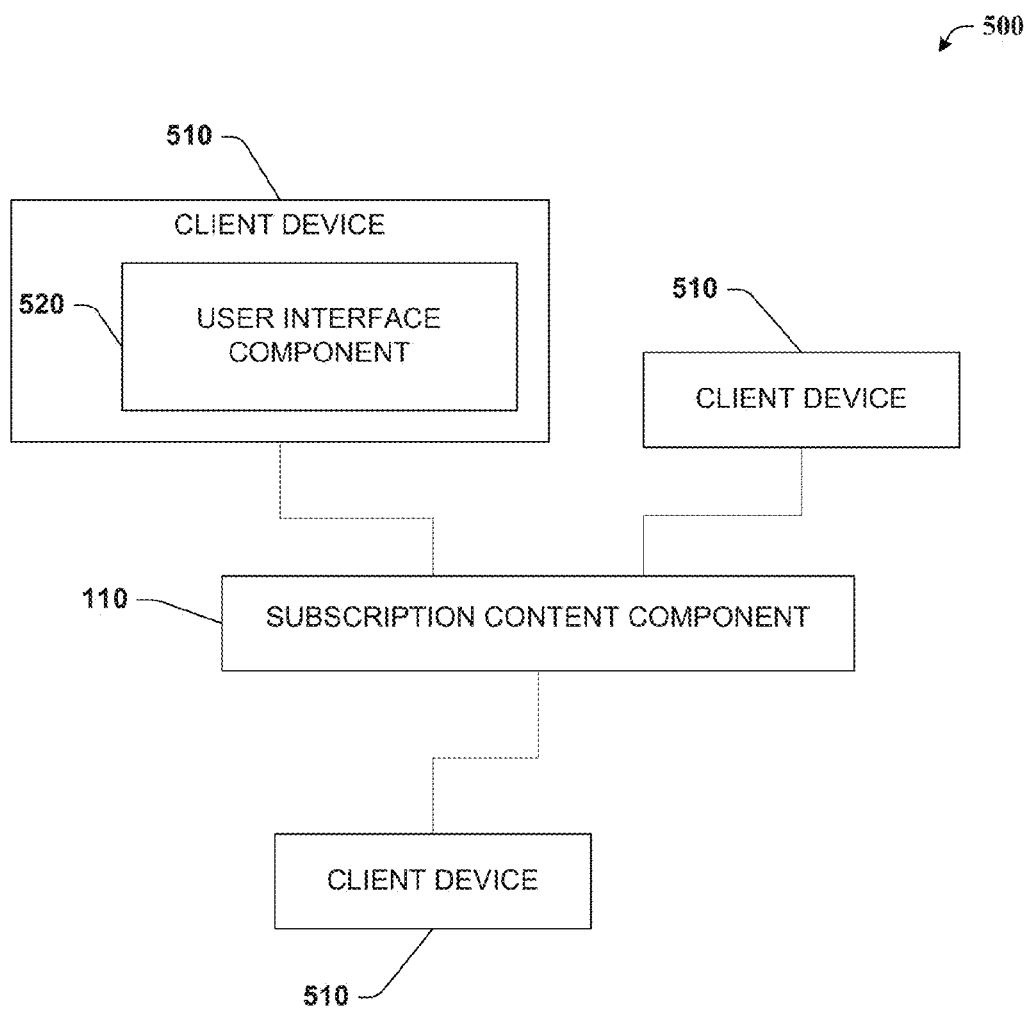
FIG. 5 is a block diagram of an exemplary non-limiting system that provides content and source information related to channels in accordance with implementations of this disclosure.

Referring to FIG. 5, a system 500 that provides source information for subscribe and unsubscribe events is depicted. System 500 includes a subscription content component 110 that determines source information for subscribe and unsubscribe events from subscribers 170 to channels 130 and presents the source information to content providers 120. System 500 further includes client devices 510 which are employed by subscribers 170 and content providers 120 to interact with subscription content component 110. While three client devices 510 are depicted, it is understood that any suitable number of client devices 510 can interact with subscription content component 110 concurrently.

Client device 510 can be any suitable type of device for interacting with a server over a wired or wireless communication link, for example, a mobile phone, personal data assistant, laptop computer, tablet computer, desktop computer, server system, cable set top box, satellite set top box, cable modem, television set, media extender device, blu-ray device, DVD (digital versatile disc or digital video disc) device, compact disc device, video game system, audio/video receiver, radio device, portable music player, navigation system, car stereo, etc. Moreover, client device 510 can include a user interface component 520 (e.g., a web browser or application), that can receive and present displays or reports generated by presentation component 220. Furthermore, user interface component 520 can accept entry of requests for and customizations to displays or reports from content providers 120, and send the requests and customizations to presentation component 220. Additionally, user interface component 520 can accept entry of requests for content and requests related to subscriptions from subscribers and send the requests to subscription content component 110. In addition, user interface component 520 can receive and display content and responses from subscription content component 110 related to requests from subscribers 170.

Figure 6:
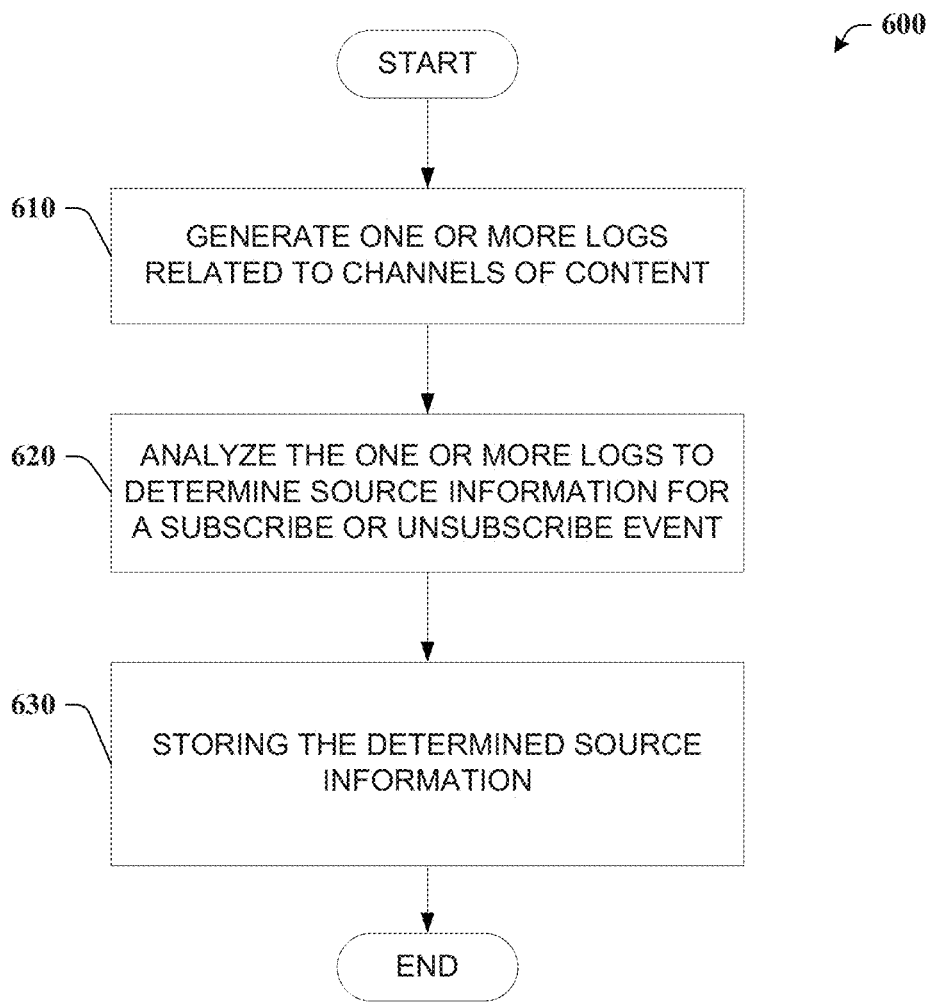
FIG. 6 is an exemplary non-limiting flow diagram for determining source information for subscribe and unsubscribe events in accordance with implementations of this disclosure.
Figure 7:
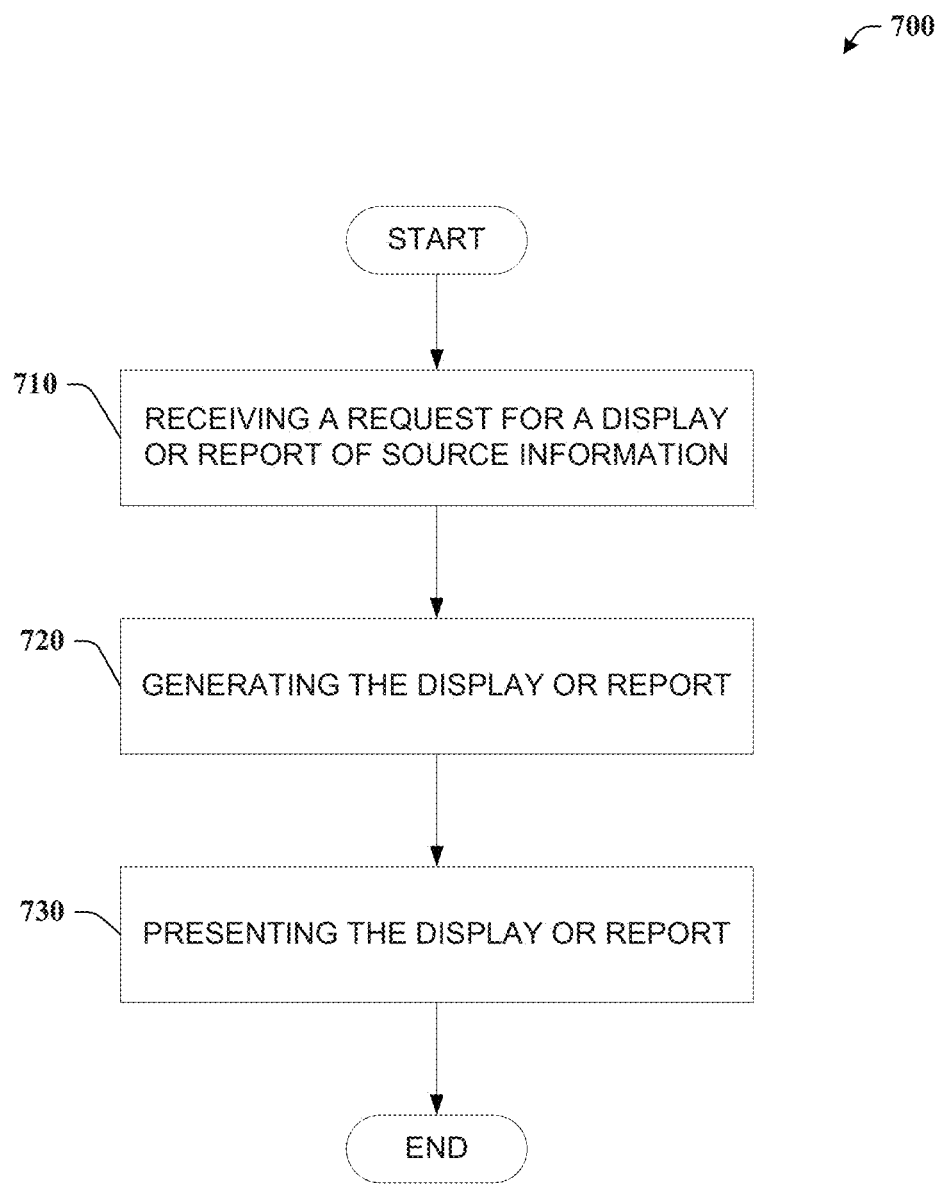
FIG. 7 is an exemplary non-limiting flow diagram for presenting source information in accordance with implementations of this disclosure.

FIGS. 6-7 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Referring to FIG. 6, an exemplary method 600 for determining source information for subscribe and unsubscribe events is depicted. At reference numeral 610, one or more logs, as discussed above, are generated and stored recording interactions of content providers, subscribers, and other websites with subscription content component and channels (e.g. by a logging component 160). At reference numeral 620, source information, as discussed above, is determined (e.g. by a source determination component 210) by analyzing one or more logs to infer a referring source from which a subscribe or unsubscribe event was initiated. At reference numeral 630, determined source information is stored (e.g. by a source determination component 210). It is noted that operations of method 600 can be performed in substantially real-time and concurrently with the interactions of content providers, subscribers, and other websites with the subscription content component and channels, thereby having source identification information readily available for content provider requests with minimal delay. In this manner, content providers can access source information in substantially real-time that allows them to adjust content quickly to maximize acquisition of subscribers or minimize loss of subscribers. For example, having information quickly that a particular content is causing subscribers to unsubscribe can allow a content provider to remove the content and head off a potentially significant number of other subscribers from unsubscribing. In another example, knowing that a particular content is generating subscriptions, for example, a video associated with a particularly newsworthy event, can allow a content provider to add additional content related to the newsworthy event, thus enabling the content provider to focus its resources on providing content that is more likely to be of interest to potential new subscribers.

Referring to FIG. 7, an exemplary method 700 for presenting display or reports of source information is depicted. At 710, a request for a display or report, as discussed above, is received (e.g. by a presentation component 220) from an entity, for example from a content provider. For example, a content provider can request to automatically receive a display or report at a regular interval or can request a display or report for immediate presentation. Furthermore, the requested display or report can be a predefined display or report, or can be customized to the content provider's preferences. At 720, the requested display or report is generated (e.g. by a presentation component 220) at an appropriate time based upon the request. For example, the display or report can be generated at an interval specified in the request or generated immediately. At 730, the requested display or report is presented to the entity making the request. For example, the display or report can be delivered proactively to the entity, for example, as an e-mail attachment or fax, or can make the display or report available through a web page, application, or application programming interface (API).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
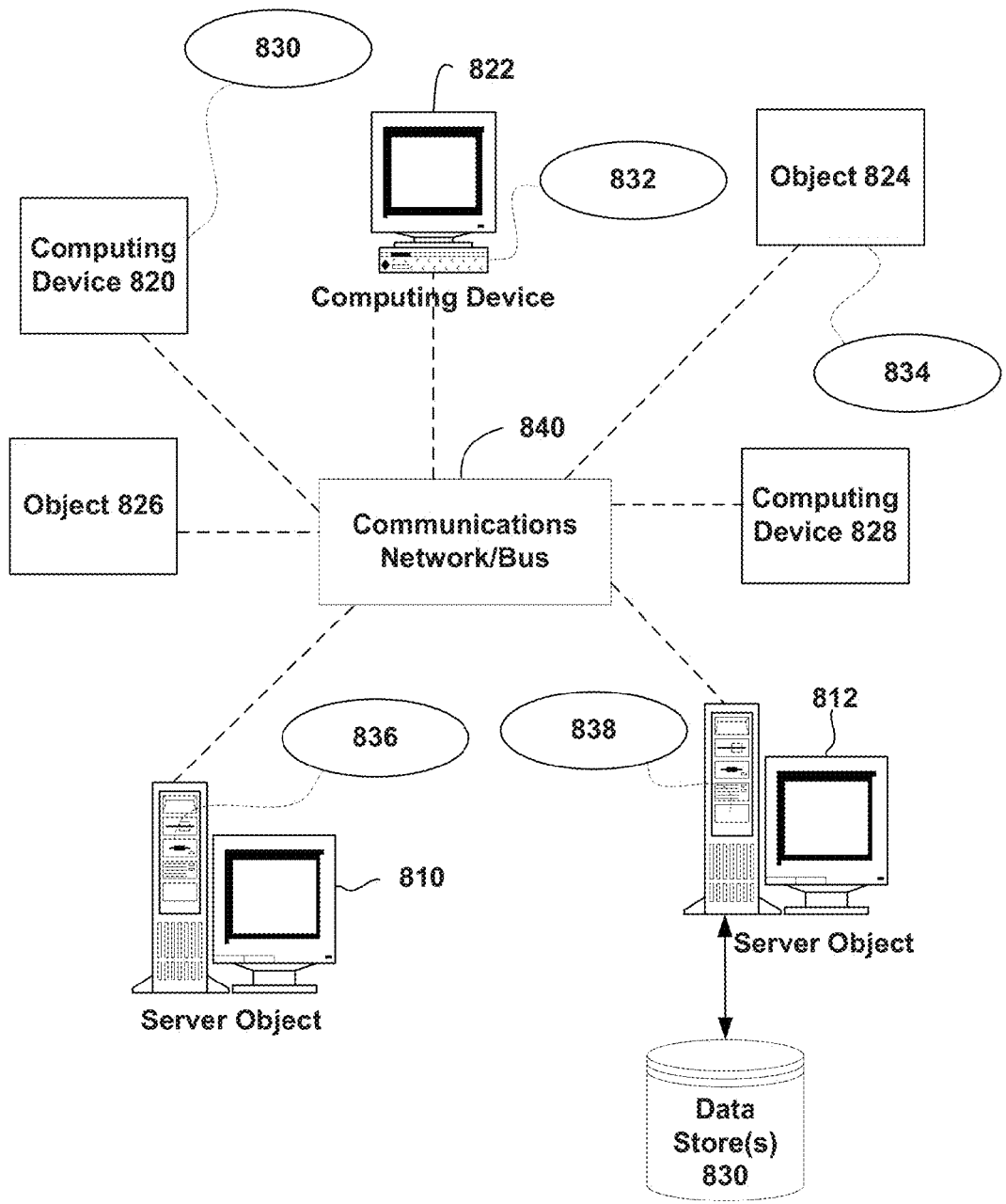
FIG. 8 is a block diagram representing an exemplary non-limiting networked environment in which the various embodiments of this disclosure can be implemented.

FIG. 8 provides a schematic diagram of an exemplary networked or distributed computing environment. The distributed computing environment comprises computing objects 810, 812, etc. and computing objects or devices 820, 822, 824, 826, 828, etc., which may include programs, methods, data stores, programmable logic, etc., as represented by applications 830, 832, 834, 836, 838. It can be appreciated that computing objects 810, 812, etc. and computing objects or devices 820, 822, 824, 826, 828, etc. may comprise different devices, such as personal digital assistants (PDAs), audio/video devices, mobile phones, MP3 players, personal computers, laptops, tablets, etc.

Each computing object 810, 812, etc. and computing objects or devices 820, 822, 824, 826, 828, etc. can communicate with one or more other computing objects 810, 812, etc. and computing objects or devices 820, 822, 824, 826, 828, etc. by way of the communications network 840, either directly or indirectly. Even though illustrated as a single element in FIG. 8, network 840 may comprise other computing objects and computing devices that provide services to the system of FIG. 8, and/or may represent multiple interconnected networks, which are not shown. Each computing object 810, 812, etc. or computing objects or devices 820, 822, 824, 826, 828, etc. can also contain an application, such as applications 830, 832, 834, 836, 838, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 8, as a non-limiting example, computing objects or devices 820, 822, 824, 826, 828, etc. can be thought of as clients and computing objects 810, 812, etc. can be thought of as servers where computing objects 810, 812, etc. provide data services, such as receiving data from client computing objects or devices 820, 822, 824, 826, 828, etc., storing of data, processing of data, transmitting data to client computing objects or devices 820, 822, 824, 826, 828, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 840 is the Internet, for example, the computing objects 810, 812, etc. can be Web servers, file servers, media servers, etc. with which the client computing objects or devices 820, 822, 824, 826, 828, etc. communicate via any of a number of known protocols, such as the hypertext transfer protocol (HTTP). Objects 810, 812, etc. may also serve as client computing objects or devices 820, 822, 824, 826, 828, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 9 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. Neither is the computing environment 900 be interpreted as having any dependency or requirement relating to any one or combination of components illustrated in the exemplary operating environment 900.

With reference to FIG. 9, an exemplary computing device for implementing one or more embodiments in the form of a computer 910 is depicted. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 910. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring audio segments), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the nontriggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter may be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A device, comprising:
   at least one processor;
   at least one non-transitory computer readable medium communicatively coupled to the at least one processor, the at least one non-transitory computer readable medium having stored therein computer-executable instructions, comprising:
      a logging component that generates one or more logs containing log entries related to subscriptions to channels of content, wherein the log entries are of at least two types including:
         a first type of log entry that indicates the referring source from which a subscriber initiated a request for at least one of a subscribe or an unsubscribe event, and
         a second type of log entry that indicates completion of the at least one of the subscribe or the unsubscribe event,
         wherein the first type of log entry and second type of log entry do not contain uniquely identifiable information common to the first type and the second type such that a log entry of the first type is explicitly linked to a log entry of the second type; and
      a source determination component that analyzes the one or more logs to determine a referring source associated with a completed subscribe or unsubscribe event by inference of at least two common characteristics from at least two parameters of the first type of log entry with at least two parameters of the second type of log entry.

2. The device of claim 1, wherein the common characteristics includes at least of one a geographic location, a channel, a temporal characteristic, the subscribe event, or the unsubscribe event.

3. The device of claim 1, wherein the source determination component further determines the referring source in real time as the one or more logs are generated.

4. The device of claim 1, wherein the source determination component further derives additional information from a parameter in a log entry in order to infer at least one of the two common characteristics.

5. The device of claim 4, wherein the source determination component further derives the additional information identifying a channel based upon a universal resource locater included in the parameter, wherein the universal resource locater includes a content item included in the channel.

6. The device of claim 4, wherein the source determination component further derives the additional information identifying a geographic location from an internet protocol address included in the parameter.

7. The device of claim 1, wherein the source determination component further determines a confidence score for the referring source indicating an estimated accuracy of the determination of the referring source.

8. The device of claim 1, further comprising a presentation component that generates at least one of a display or report of the referring source.

9. The device of claim 8, wherein the presentation component further enables customization of the at least one of a display or report.

10. The device of claim 8, wherein the presentation component further automatically generates the at least one of a display or report at a predefined interval based upon a preference setting.

11. The device of claim 8, wherein the presentation component further aggregates respective referring sources for a plurality of completed at least one of subscribe or unsubscribe events.

12. The device of claim 11, wherein the at least one of a display or report indicates a number of the plurality of completed at least one of subscribe or unsubscribe events that are associated with a particular referring source.

13. A method, comprising:
   generating, by a system including a processor, one or more logs containing log entries related to subscriptions to channels of content, wherein the log entries are of at least two types including:
      a first type of log entry that indicates the referring source from which a subscriber initiated a request for at least one of a subscribe or an unsubscribe event, and
      a second type of log entry that indicates completion of the at least one of the subscribe or the unsubscribe event,
      wherein the first type of log entry and second type of log entry do not contain uniquely identifiable information common to the first type and the second type such that a log entry of the first type is explicitly linked to a log entry of the second type; and
   determining, by the system, a referring source associated with a completed at least one of subscribe or unsubscribe event based upon inferring at least two common characteristics from at least two parameters of the first type of log entry with at least two parameters of the second type of log entry from the one or more logs.

14. The method of claim 13, wherein the common characteristic includes at least one of a geographic location, a channel, a temporal characteristic, the subscribe event, or the unsubscribe event.

15. The method of claim 13, wherein the determining the referring source occurs in real time as the one or more logs are generated.

16. The method of claim 13, wherein the inferring the at least common characteristics comprises deriving additional information from a parameter in a log entry in order to infer at least one of the two common characteristics.

17. The method of claim 16, wherein the deriving the additional information comprises identifying a channel based upon a universal resource locater included in the parameter, wherein the universal resource locater includes a content item included in the channel.

18. The method of claim 16, wherein the deriving the additional information comprises identifying a geographic location from an internet protocol address included in the parameter.

19. The method of claim 13, wherein the determining the referring source comprises determining a confidence score for the referring source indicating an estimated accuracy of the determination of the referring source.

20. The method of claim 13, further comprising generating, by the system, at least one of a display or report of the referring source.

21. The method of claim 20, wherein the generating at least one of a display or report comprises generating a customizable at least one of a display or report.

22. The method of claim 20, wherein the generating at least one of a display comprises automatically generating the at least one of a display or report at a predefined interval based upon a preference setting.

23. The method of claim 13, further comprising aggregating, by the system, respective referring sources for a plurality of completed at least one of subscribe or unsubscribe events.

24. The method of claim 23, further comprising generating, by the system, at least one of a display or report of the aggregated referring sources indicating a number of the plurality of completed at least one of subscribe or unsubscribe events that are associated with a particular referring source.

25. A non-transitory computer-readable medium having instructions stored thereon that, in response to execution, cause a system including a processor to perform operations comprising:

generating one or more logs containing log entries related to subscriptions to channels of content, wherein the log entries are of at least two types including:

a first type of log entry that indicates the referring source from which a subscriber initiated a request for at least one of a subscribe or an unsubscribe event, and a second type of log entry that indicates completion of the at least one of the subscribe or the unsubscribe event, wherein the first type of log entry and second type of log entry do not contain uniquely identifiable information common to the first type and the second type such that a log entry of the first type is explicitly linked to a log entry of the second type from the one or more logs;

determining a referring source associated with a completed at least one of subscribe or unsubscribe event based upon deriving at least two common characteristics from at least two parameters of the first type of log entry with at least two parameters of the second type of log entry.

* * * * *